J. C. LEFFEL.
Grain-Drills.
No. 152,562.　　　　　　　　　　Patented June 30, 1874.
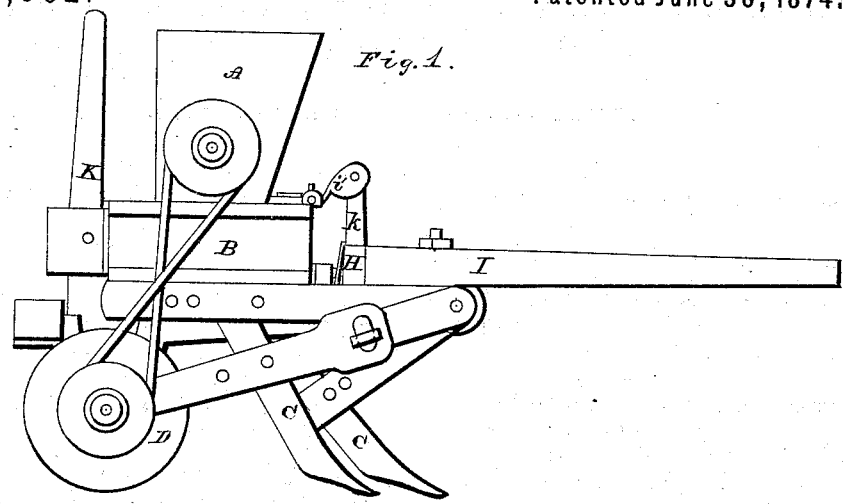
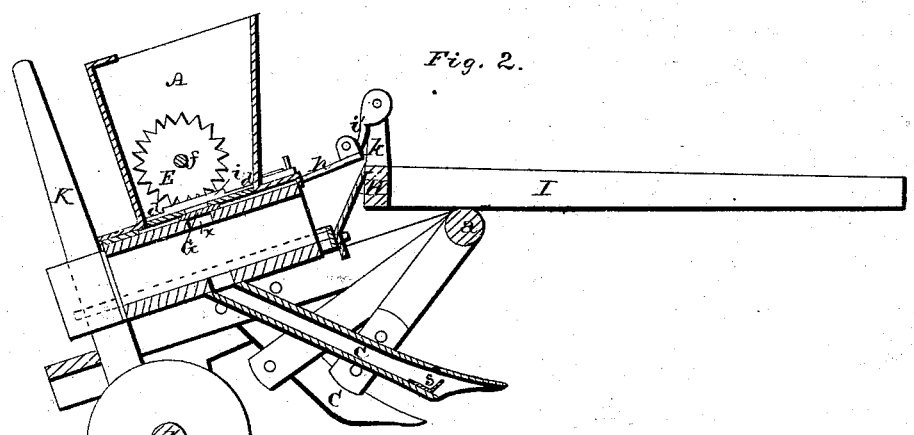
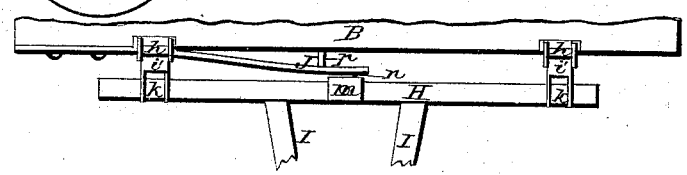
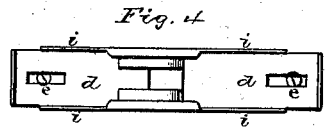
WITNESSES.　　　　　　　　　　INVENTOR.
Edwd. S. Kaiser,　　　　　　　　Jno. C. Leffel
J. Wm. Garner.　　　　　　　　per
　　　　　　　　　　　　　　　F. A. Lehmann, Atty.

UNITED STATES PATENT OFFICE.

JOHN C. LEFFEL, OF SHELBINA, MISSOURI, ASSIGNOR OF ONE-HALF HIS RIGHT TO WILLIAM RIDGE.

IMPROVEMENT IN GRAIN-DRILLS.

Specification forming part of Letters Patent No. 152,562, dated June 30, 1874; application filed March 28, 1874.

*To all whom it may concern:*

Be it known that I, JNO. C. LEFFEL, of Shelbina, in the county of Shelby and State of Missouri, have invented certain new and useful Improvements in Grain-Drills; and I do hereby declare the following to be a full, clear, and exact description of the invention, such as will enable others skilled in the art to which it pertains to make and use it, reference being had to the accompanying drawings, which form part of this specification.

My invention relates to that class of grain-drills in which the grain is placed in a box or hopper and conveyed through hollow conductors or shovels to the ground; and the nature of my invention consists in the construction of the gages for regulating the quantity of grain sown; also, in certain devices whereby the grain is cut off and the shovels raised out of the ground at one operation.

Figure 1 is a side elevation of my invention. Fig. 2 is a vertical cross-section of the same. Figs. 3, 4, and 5 are detail views of the same.

A represents the seed-box placed upon a frame, B. C C are the hollow conductors or shovels attached to the frame, and braced from a rod, $a$, at the front of the frame. In the lower back portion of the frame is a rod or axle, $b$, with a series of covering-wheels, D D, one of which is secured on the axle, and the others revolving thereon; or they may be all fast on the axle, if so desired. In the bottom of the seed-box A are the usual seed-openings $x$ $x$, through which the seed passes down into the conductors or shovels C C, and through the same to the ground. On each side of each of these openings is a flange, $i$, extending nearly across the box, and between these flanges are placed two gage-plates, $d$ $d$, the inner ends of which are slotted or forked, and may be moved in and out for the purpose of diminishing or increasing the size of the seed-openings, and thereby regulating the quantity of seed that is to pass through. The prongs of these gage-plates are elevated so as to form, in connection with the side flanges, a kind of box over the seed-opening. The plates $d$ $d$ pass out, one in front and the other in rear of the box, and their outer ends are slotted and held to the frame B by means of a screw, $e$, through said slot, so that they can be easily adjusted, as desired. Through the seed-box passes a longitudinal shaft, $f$, having a toothed wheel, E, over each seed-opening to feed the grain into the gages, force the grain through them, and keep out all obstructions. The shaft $f$ is revolved by suitable belts, cords, or chains from the axle $b$. Under the bottom of the box A is a slide, G, to close the seed-openings $x$ $x$. This slide is provided with arms $h$ $h$, connected by suitable coupling-links $i'$ $i'$ with short posts $k$ $k$ upon a cross-bar, H, which is attached to the inner end of the V-shaped tongue I. This tongue is, by clevises or other suitable devices, attached to the front rod $a$, so that it can turn on the same. To the rear of the cross-bar H is attached a perforated arm, $m$, into the holes on which springs a pin, $n$, on the outer end of a spring, J, fastened to the front of the frame B. The spring J is, by a rod, $p$, connected with a lever, K, on the back of the machine, by means of which the spring-pin $n$ is withdrawn from the arm $m$, and the machine tilted forward or backward, after which the pin springs into another hole on the arm, and holds the machine in the new position, and at the same time operates the slide G.

It will be noticed that the same movement of the lever K which tilts the machine to raise the shovels out of the ground closes the slide, and the same movement which lowers the shovels into the ground opens the slide, the tongue in both positions being held perfectly rigid and stiff.

Inside of each hollow shovel C is attached a flat hook, $s$, upon which the grain falls just as it emerges therefrom, thereby scattering the grain and preventing it from being deposited all in one heap.

Having thus fully described my invention, what I claim as new, and desire to secure by Letters Patent, is—

1. The adjustable slotted gage-plates $d$, having their inner ends forked and bent, as shown, in combination with the flanges $i$ and toothed wheel E, substantially as and for the purpose set forth.

2. The slide G, with arms $h$ and couplings $i'$, in combination with the pivoted tongue I, cross-bar H, and posts $k$, all constructed substantially as and for the purposes herein set forth.

3. The combination, with the tongue I and cross-bar H, of the perforated arm $m$, spring J, with pin $n$, rod $p$, and lever K, substantially as and for the purposes herein set forth.

4. In a seeding-machine, the combination of the draft-tongue and the seed-slide, connected together to enable the slide to be opened and closed by the movements of the frame, substantially as shown and described.

In testimony that I claim the foregoing I have hereunto set my hand this 21st day of March, 1874.

JOHN C. LEFFEL.

Witnesses:
    JOHN W. SHAFER,
    J. G. CHANDLER.